(No Model.)
E. C. MERSHON & H. D. RICHTERS.
PULLEY.
No. 456,731. Patented July 28, 1891.
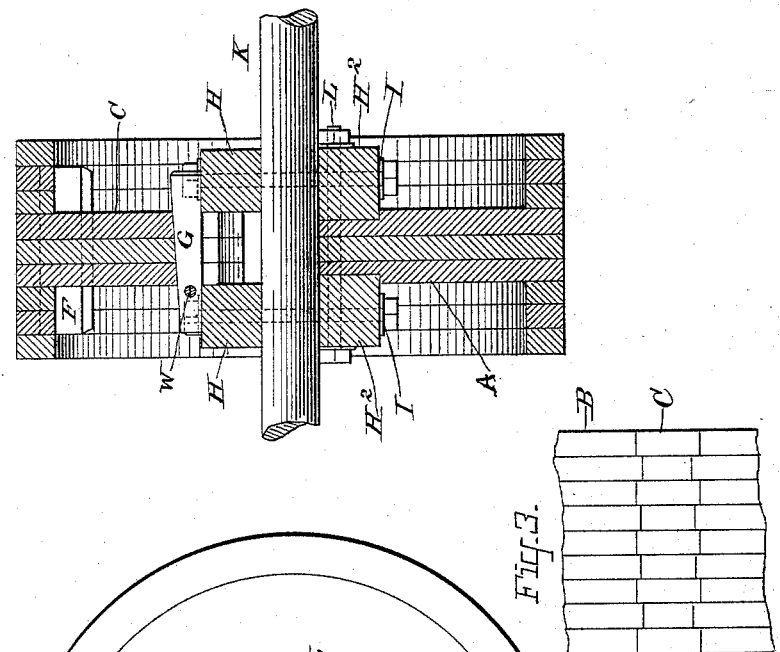
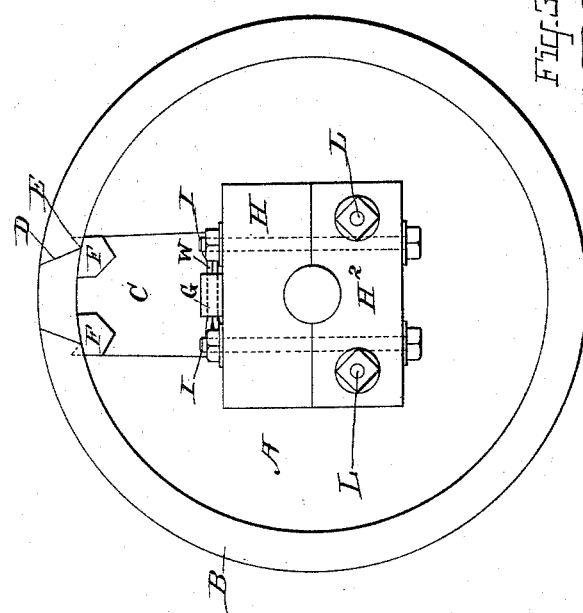
ATTEST:
INVENTOR:
Edward C. Mershon
Henry D. Richters
By H. L. Townsend
Attorney

UNITED STATES PATENT OFFICE.

EDWARD C. MERSHON AND HENRY D. RICHTERS, OF EAST SAGINAW, MICHIGAN.

PULLEY.

SPECIFICATION forming part of Letters Patent No. 456,731, dated July 28, 1891.

Application filed July 16, 1890. Serial No. 358,897. (No model.)

*To all whom it may concern:*

Be it known that we, EDWARD C. MERSHON and HENRY D. RICHTERS, citizens of the United States, and residents of East Saginaw, in the county of Saginaw and State of Michigan, have invented a certain new and useful Pulley, of which the following is a specification.

Our invention relates to the construction of pulleys in which a removable section or segment is provided to permit the pulley to be applied or detached from its shaft without disturbing the shaft.

The object of our invention is to secure simplicity and strength in the construction, while at the same time providing for the fastening of the section or segment in place in such a way that there shall be no liability of its becoming detached while the pulley is in use.

Heretofore in pulleys of this class the removable section has usually been inserted from the outside and held in position by keys or dowels, the construction being such that there is more or less danger of the removable section or segment becoming detached. In our invention it is impossible for the segment to accidentally fly out, and, moreover, when it is secured in place, all parts are bound securely together, so as to make virtually a solid pulley and to give better support to the rim than is the case with many previous constructions.

In other cases the removable section or segment has been so constructed that it can be put into place or detached only by movement in a longitudinal direction—that is to say, in a line parallel to the shaft or hub of the pulley.

Our invention consists, essentially, in forming the meeting surfaces of a removable section and the main body of the pulley with a taper or offset, such that the section will be held against displacement radially outward by the engagement of such meeting surfaces, but may be moved radially inward for the purpose of detaching it from the body of the pulley.

In combination with the removable section or segment we employ a proper key or wedge that tends to force the same radially outward, as hereinafter more fully described, and locks the same in place.

Our invention consists, further, in the especial combinations of apparatus and the peculiar organizations of parts whereby we attain the objects of our invention and whereby the pulley may be provided with interchangeable hubs, so that it may be made to fit any size of shaft. By our construction we also dispense with the bushing which is ordinarily employed with pulleys of this general class.

In the accompanying drawings, Figure 1 is a side elevation of a construction of a pulley embodying our invention. Fig. 2 is a vertical cross-section through the pulley on the line of the removable section. Fig. 3 is an edge view of the pulley at the point where the removable section is located.

Our invention is applicable to pulleys made of any material, but is especially designed for use in wood pulleys built up from layers of wood placed one upon the other with the grain crossing, and having the layers fastened or secured together in any usual manner.

A is the web of the main body of the pulley, and B the rim thereof.

C is the removable section, which is located in an opening in the main body of the pulley, of sufficient size to permit the withdrawal of the pulley edgewise from the shaft on which it is fastened. The removable section or segment, as we have herein shown it, consists of a web portion and a rim portion connected together and preferably made integral. As will be seen on reference to Fig. 2, the web portion is cut away, or stops short, at the inner end of the periphery of the shaft upon which the hub is placed, so that the said segment may be moved radially inward to a considerable extent without meeting any obstruction. This cutting away of the segment amounts to a reduction of its dimension in a radial direction, the reduction being made at the inner edge or end.

At some portion of the meeting surfaces of the removable segment C and the main body of the pulley we provide an offset, bevel, or taper of proper form to hold the segment C against radial movement or displacement outwardly through the opening in which it is located. Such bevel or offset we provide at any portion of the removable segment, but preferably we make the rim, as at D, with a taper or bevel tapering outwardly, as indicated. We prefer, also, to provide an offset, as at E, where the web of the removable section, or a part secured thereto, shall engage with the rim B of the main portion of the pulley.

F F are hard wood blocks or gibs, which are carried by the web C and extend transversely from either side thereof nearly across the entire rim, as shown. These blocks give support to the rim of the removable section C, as well as to the portion of the rim B, of the pulley where they engage with such rim when the section or segment is forced outwardly into place. Preferably, we make the rim portion and the web portion of the removable section in a single piece, though it is obvious that the two parts might be made separate and the gibs or block F carried by either the rim or the web. The under side of the rib may be rabbeted or cut away or not, as desired, to receive such offset on the web. By the construction of the segment in the manner described it is free to move radially inward, but is held against displacement radially outward through the engagement of the beveled taper or offset provided.

In the construction shown the offsets on the removable section, by the engagement of which with the main body the section or segment is held against radial displacement, are formed on the gibs or blocks F. While we have shown the taper, bevel, or offset as formed both on the rim and on the removable section, it is obvious that the taper might include a portion of the web instead of being on the rim only, or might be in the web alone, the rim portion being straight or having its two edges parallel, so as not to obstruct its movement inwardly. The construction shown gives great solidity when combined with the other fastening devices and supports.

We preferably form the meeting surfaces of the removable section on an irregular or wavy line parallel to the pulley-shaft, as indicated in Fig. 3, thus preventing longitudinal displacement of the segment. This irregular or wavy meeting surface is preferably located only in the rim of the segment, so that when the segment is moved radially inward to free its rim from the rim B it may be then moved longitudinally to one side and entirely freed from the main body of the pulley.

It will be noted that by virtue of my arrangement, whereby the meeting lines of the rim of the removable segment C are made both irregular or wavy in a longitudinal direction and tapering outwardly, the segments are held securely in position, both against longitudinal and radial displacement, but may be removed in a longitudinal direction after the wedge-key G, referred to below, has been removed and the segment has been moved radially inward.

G is a key or wedge, which serves to hold the segment in position and to force it radially outward, so that the meeting surfaces of the removable segment and the main body will be firmly engaged. This key or wedge may be held against detachment by means of a pin W, indicated in dotted lines in Fig. 1 and shown in end view, Fig. 2, which pin is inserted through the inner end of the wedge after the latter has been driven or forced into place. This wedge or key G is located between the removable section or segment and a block or bearing carried by the main portion of the pulley. Preferably we employ for such bearing the blocks H H, which form a part of the detachable hub and are clamped to the hub-blocks $H^2$ by the bolts I I, which serve to fasten the hub securely to the shaft K.

The portion $H^2$ of the hub consists of blocks which are seated in the web of the pulley, as indicated in Fig. 2, and are fastened to the web by the longitudinal bolts L. By this construction the hubs of the pulley may be readily detached and attached, and by being so made it is easy to provide interchangeable hubs adapted to fit different sizes of shaft. In removing the segment C, the wedge or key G is forced out of place, thus allowing the segment C to be moved radially inward until its web is disengaged from the rim B. It may be thus moved sidewise in a longitudinal direction, the blocks H having been removed by detaching the same from the portion $H^2$ of the hub. The pulley may be then slipped off the shaft K, the shaft being now free to pass out through the opening left by removal of the segment C and the part H of the hub.

What we claim as our invention is—

1. In a pulley, the combination, with the body thereof, of a removable section or segment C, having the meeting lines of its rim with its body made both irregular or wavy in a longitudinal direction and tapering outwardly, so as to hold it securely in position both against longitudinal displacement and radial displacement outwardly, but to permit it to be moved inward and then longitudinally for removing from said body, and a wedge-key G and bearings therefor upon a hub or block carried by the main portion of the pulley.

2. The combination, in a removable pulley, of a removable section C, formed with a radial taper, as at D, the smaller end of which is at the rim and having its meeting surfaces at the taper made irregular or wavy in a direction parallel to the pulley-shaft, such segment being reduced or cut away at its inner end, as described, with a longitudinal wedge G and blocks H, forming a part of the hub of the pulley.

3. The combination, in a pulley, of a removable segment or section C, having an outer taper D at its rim portion, with gibs or blocks E, attached to the web portion and extending transversely beyond the web and underneath the rim of the body portion.

4. In a pulley, the combination, substantially as described, of the removable segment or section C, wedge or key G, blocks H, bolts I, blocks $H^2$, and bolts L.

Signed at East Saginaw, in the county of Saginaw and State of Michigan, this 31st day of May, A. D. 1890.

EDWARD C. MERSHON.
   HENRY D. RICHTERS.

Witnesses:
 W. R. LONGSTREET,
 CHARLES E. MERSHON.